June 1, 1954
H. M. STUELAND
2,679,943
TRACTOR-MOUNTED LOADER
Filed March 29, 1951
2 Sheets-Sheet 1
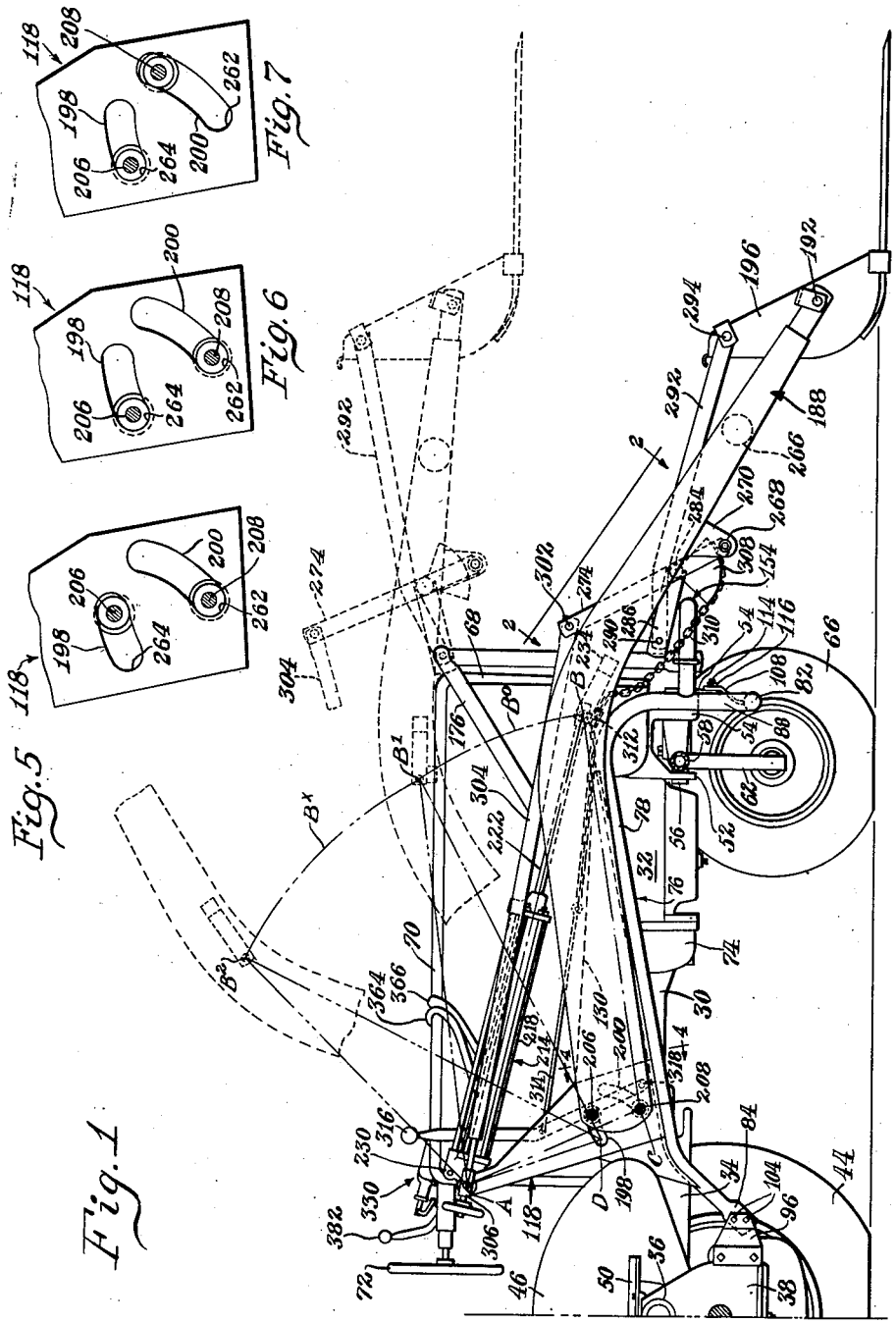
INVENTOR.
Harold M. Stueland
BY
Attorneys June 1, 1954
H. M. STUELAND
2,679,943
TRACTOR-MOUNTED LOADER
Filed March 29, 1951
2 Sheets-Sheet 2
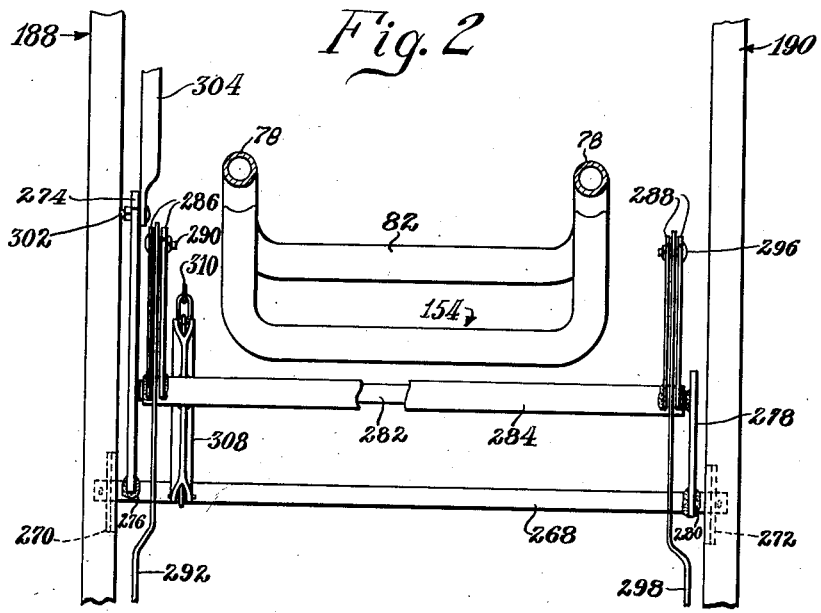
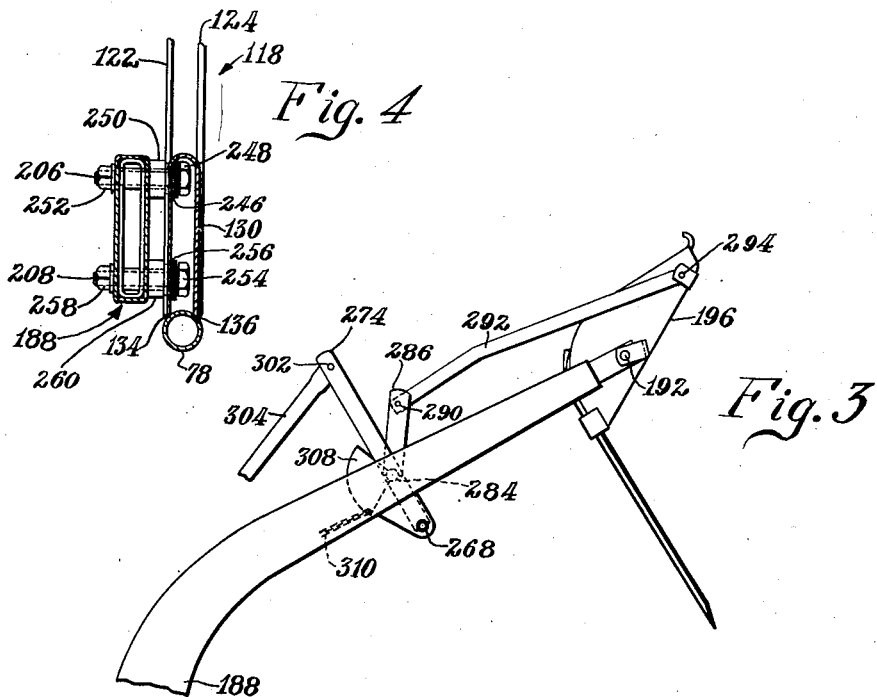
INVENTOR.
Harold M. Stueland
BY
Attorneys Patented June 1, 1954

2,679,943

UNITED STATES PATENT OFFICE 2,679,943

TRACTOR-MOUNTED LOADER

Harold M. Stueland, East Moline, Ill., assignor to Deere & Company, Moline, Ill., a corporation of Illinois Application March 29, 1951, Serial No. 218,105

9 Claims. (Cl. 214—140)

This invention relates to a load-moving machine and more particularly to such machine as embodied in a tractor-mounted loader of the type that has found such wide acceptance on farms for the handling of manure, dirt, gravel, and other materials.

A typical tractor-mounted loader comprises a load-bearing element in the form of a boom, usually comprising a pair of longitudinal arms, one at each side of the tractor, and connected to the tractor for swinging of the front end of the boom from a lowered or working position to a raised or loading position. The material-handling element comprises a scoop or bucket which is preferably carried by the forward end of the boom and has a level position while digging. The scoop is mounted for swinging to a tilted position so that the material carried thereby may be dumped into a vehicle or at some location apart from the place from which it was dug.

It has been found in the use of loaders of this type that the power requirements are different in the digging phase of the operation and in the elevating phase of the operation. For example, in the handling of manure which may have accumulated over a prolonged period and which may have become matted and frozen with straw, the power required to break the manure loose from the pile is considerably more than that required to elevate the loading scoop. Power differentials for the purposes indicated have been achieved in some instances by the use of linkages giving a greater mechanical advantage at one time than at another, by the use of dual hydraulic motors having different capacities, and by the use of auxiliary lifting means engageable with the ground during that initial stage of upward movement of the boom involved in breaking the material loose from the pile.

According to the present invention, the loader design departs materially from any of the foregoing expedients and uses a system of selectively successively effective pivots for mounting the boom on the supporting frame, by means of which the moment arm during the initial stages of operation is more powerful than that utilized in later stages of the operation. Specifically, this result is achieved by the use of a support having therein a pair of arcuate slots or equivalent guide means. One end of the boom structure is arranged to operate in these slots and has a pair of pivot members. One slot or guide lies on an arc about one pivot and the other slot or guide lies on another arc about the other pivot. During the lower portion of upward swinging movement of the boom, the boom is carried by one pivot which seats at one end of one of the slots, and the other pivot travels through the other slot until it approaches a seating relationship therein, after which the second pivot seats in its slot and the boom continues upwardly, the first pivot traveling in its slot. The general result is a relatively powerful and relatively slow initial movement and subsequently a relatively less powerful but relatively faster movement in the upper portion of the raising movement of the boom.

The foregoing and other important objects and desirable features inherent in and encompassed by the invention will become apparent as the invention is fully disclosed in the following detailed description and accompanying sheets of drawings in which Figure 1 is a side elevational view of the tractor-mounted loader, with portions of the tractor omitted, and illustrating in full lines the lowered or digging position of the loader and in broken lines and intermediate position and a high position of the loader boom;

Figure 2 is a plan view, on an enlarged scale, of a forward portion of the boom and bucket control means as seen along the line 2—2 of Figure 1;

Figure 3 is a side elevational view of the forward portion of the boom and bucket, showing this bucket in dumped position, the view being drawn to the same scale as that of Figure 1;

Figure 4 is an enlarged transverse fragmentary sectional view taken on the line 4—4 of Figure 1; and Figures 5, 6 and 7 are fragmentary elevational views showing successive stages in the movement of the selectively effective pivots for mounting the boom on the loader frame.

In general

Reference herein to the machine as having right- and left-hand sides is made with respect to the position of an observer standing behind the machine and facing forwardly. For the purposes of brevity, there will also be used such expressions as "front" and "rear" and "upper" and "lower." It should be understood, however, that the description in this respect is not intended to mean that the parts cannot be otherwise arranged.

Also, the invention is disclosed in connection with a tractor of one well-known type. Obviously, the general principles of the invention may be utilized in connection with loaders mounted on other tractors or even with loaders mounted on supporting frames other than the base provided by a tractor.

*Tractor construction*

The tractor comprises a longitudinal body 30 having at its forward end an internal combustion engine 32 and at its rear end a transmission casing 34. The transmission casing is joined to a transverse rear axle structure 36 having at its opposite ends depending housings 38 and traction wheels 44, only one of each being shown. Fenders 46, only one of which is shown, delineate opposite sides of an operator's station 50 of typical arrangement.

The forward end of the internal combustion engine 32 includes a pair of fore-and-aft spaced apart supports 52 and 54 (Figure 1) which between them carry a longitudinal pivot member 56 serving as a pivotal mounting for a transverse front axle 58. This axle is of arched construction and includes upright members 62 (only one being shown) rigidly joined at their upper ends to the transverse axle 58 and journaling at their lower ends steerable front wheels 66, only one of which appears in the drawing.

The tractor further includes a forward upright grille 68 behind which extends a longitudinal hood 70 for enclosing the engine 32. The hood terminates at its rear end just forwardly of the operator's station 50. The front wheels 66 are steerable by means of a conventional steering wheel 72 located forwardly of the operator's station 50.

The general nature of the tractor construction is such that the rear traction wheels 44 are relatively widely spaced apart, as are the steerable front wheels 66, and the longitudinal body 30—32—34 is substantially centrally disposed between the right- and left-hand wheels.

The forward part of the body part 30 is joined to the rear part of the internal combustion engine 32 by conventional structure including a clutch housing 74.

*Frame structure*

The attachment frame is designated generally by the numeral 76 and has longitudinal frame members 78 and a transverse bar or bight 82. The rear ends of the frame members 78 (only one being shown) are turned downwardly at 84 and the forward portions of these frame members are curved downwardly at 88 to join the transverse bar or bight 82.

The rear portions 84 are provided respectively with means for the mounting thereof on the depending housings 38 of the tractor. This means comprises plates 96 and removable securing means which may be in the form of a plurality of bolts 104 and 106 (Figure 1).

The transverse bar 82 carries substantially midway between its ends a mounting member 108 which is rigidly mounted on the front of the tractor by means of a pair of securing means in the form of mounting studs 114 (Figure 1). Nuts 116 are received by the studs 114 to secure the mounting plate in place.

The longitudinal frame members 78 of the attachment frame 76 are provided at their rear ends with upright supports 118, only that at the right-hand side of the machine being shown. The frame is tubular in section and the supports preferably comprise plates 122 and 124 (Figure 4) spaced apart according to the transverse dimension of the tubular section. These plates are rigidly welded along their lower edges to upper portions of the longitudinal frame members and each support is suitably braced by a forwardly tapering brace 130. As best shown in Figure 4, the brace 130 is of inverted U-shaped section welded, as at 134 and 136, along its lower edges to upper portions of the proximate longitudinal frame member 78.

A further part of the frame 76 comprises a bumper 154, which projects ahead of the grille 68 and affords ample protection to the grille in the event of collision between the loader and a vehicle having relatively low sides, as the conventional manure spreader. The frame details, as well as others, form the subject matter of copending application, Serial No. 364,715, filed June 29, 1953.

*Boom structure and mounting thereof*

The boom structure for the loader comprises right- and left-hand longitudinal load-bearing elements or arms 188 and 190, each of which is pivoted at its rear end to the frame structure 76 by means to be hereinafter described. The boom arms have at their forward ends means in the form of a pair of transversely coaxial trunnions 192 to provide means for tiltably mounting a load-carrying element in the form of a bucket or scoop 196. The bucket may be of any conventional construction, although certain details thereof are significant, as will be brought out below.

For the purposes of general description, reference will be had to the separate components at only one side of the frame structure 76 for mounting the rear ends of the boom arms 188 and 190. The plates 122 and 124 of the upright support 118 are provided with upper and lower guide means in the form of arcuate slots 198 and 200. The rear end of the right-hand boom arm 188 has upper and lower pivot elements 206 and 208 respectively cooperative with the slots 198 and 200.

The boom structure 188—190 is raised by power supplied by a pair of selectively expansible and contractible force-transmitting means, here in the form of a pair of fluid motors 214, only one of which is shown. The motor 214 is in the form of a cylinder 218 having a piston (not visible) to which is connected a piston rod 222.

The upper or rear end of the cylinder 218 is provided with a mounting portion 230 by means of which a pivotal connection is made on a transverse axis designated by the letter A in Figure 1. An intermediate portion of the inside face of the right-hand boom arm 188 has rigidly fixed thereto a mounting bracket 234 by means of which a second pivotal connection is effected at B (Figure 1) between the boom arm and the free end of the piston rod 222.

In the description to follow, only the right-hand boom arm 188 and its mounting on the upright support 118 of the frame 76 will be considered, it following from what has been said above that the arrangement is repeated at the opposite side of the machine.

The connection of the right-hand boom arm 188 to the lower portion of the upright support 118 may be best seen in Figure 4. The upper pivot element 206 comprises an anti-friction roller 246 which rolls along or is guided or controlled by the arcuate guide means or upper slot 198. This roller is carried on a transverse mounting pin or bolt 248 on which is carried a spacer 250 for maintaining the spacing between the outer plate 120 of the support 118 and the inside face of the boom arm 188. The bolt passes completely through the upper portion of the boom arm 188 and is secured by a nut 252. The lower pivot element 208 is of similar construction, comprising a bolt 254, a lower roller 256 which travels in the lower guide means or arcuate slot 200, and a securing nut 258. A spacer 260, similar to the spacer 250, is also provided. Since these details are relatively unimportant to an understanding of Figures 1, 5, 6 and 7, reference will be had to the components only by their general designations.

The rear portion of the lower arcuate slot 200 is curved to provide a seat 262 which receives and supports the lower pivot element 208 when the boom arm 188 is in its lowered or digging position. Thus, the lower pivot element 208 is carried at a lower and rearward portion of the slot 200. The center of the pivot element 208 is designated by the letter C in Figure 1. Thus, when the boom arm 188 is in the full-line position of Figure 3, the points A, B, and C lie respectively at the apices of a triangle in which: The distance AC equals the distance between the presently effective pivot 208 of the boom arm and the permanent pivot of the cylinder 218; the distance AB represents the extended length of the cylinder 218 and piston rod 222; and the distance CB is a fixed distance between the pivotal connection of the piston rod 122 to the boom arm 188 and the presently effective pivot element 208. Now, when the fluid motor 214 is contracted, the arm 188 swings about the point C and the point B moves on the arc $B^0$ until it reaches approximately the point $B^1$. The point C remains fixed, since the pivot element 208 seats at the rear seat 262 of the lower slot 200. In the meantime, the upper pivot element 206 has traveled from the position of Figure 12 to that of Figure 13 and ultimately seats at a rear seat 264 at the rear of the upper guide means or slot 198. The position of the boom 188 when these conditions obtain is indicated by the intermediate dotted-line position in Figure 1.

When the upper pivot element 206 reaches the rear seat 264 of the upper slot 198, a new point D is established (Figure 1). Whereas the prior effective triangle was represented by ABC, a new triangle $AB^1D$ is now effective. As the fluid motor 214 is further contracted, the boom arm 188 moves upwardly, the point B now traveling along an arc $B^x$ to a high or ultimate point $B^2$. During this range of movement, the pivotal connection of the boom arm 188 to the frame 76 is at the point D. Also, during this range of movement, the lower pivot element 208 is riding upwardly and forwardly in the lower slot 200. When the boom structure is in its lowered position, as shown in full lines in Figure 1, the upper pivot element 206 does not positively engage a forward portion of the slot 198. Nor does the lower pivot element 208 positively engage an upper or forward portion of the lower slot 200 when the boom structure is fully raised. Ample clearance is provided at both of these points in order to prevent damage to the upright support 118, because of the tremendous lever arm of the boom 188 relative to the lever arm determined by the spacing between the pivot elements 206 and 208. Therefore, for all practical purposes, the only seating of the elements 208 and 206 will be respectively at 262 and 264.

As the boom 188 moves from its full-line position to its intermediate dotted-line position, substantially one half of the contracting stroke of the fluid motor 214 is used. In a preferred construction, the angular range of movement ($B^0$) of the boom about the pivot C will be approximately 25 to 30 degrees. The subsequent range of movement, represented by the arc $B^x$, uses up the other half of the stroke of the motor 214, but this range is somewhat greater than the range $B^0$, being, in a preferred construction, on the order of 45 to 50 degrees. The reason that the excess of travel is obtained through the arc $B^x$ as compared to the movement through the arc $B^0$ is that the distance AD is considerably shorter than the distance AC. In other words, with the longer distance AC, the mechanical advantage of the system is greater with the triangle ABC than with the triangle $AB^1D$. This will be readily understood when it is considered that the motor 214 would have practically no effect if the point A were moved relatively close to the point C. In short, the effectiveness of the motor 214 would gradually approach zero as the point A approaches the point C. Conversely, an increase in distance between the points A and C would increase the force exerted by the motor 214. Stated otherwise, the fluid motor 214 is of uniform power application through a single stroke; yet, it is capable of exerting different forces through different portions of the strokes. It will be obvious that equivalent power means could be substituted and the same results obtained.

The reason why the power should be greater during the range of movement represented by the arc $B^0$ is that considerably more effort is required in digging or breaking loose the material from the pile and elevating it to the intermediate dotted-line position than is required for elevating the boom from the intermediate to the final position.

As the boom structure is lowered to its digging position, it pivots first about the point D and then about the point C after the lower pivot element 208 seats at 262 in the rear lower portion of the arcuate slot or guide means 200.

It will be noted also that the arcs $B^0$ and $B^x$ are not concentric, which they naturally would not be since they swing about the different pivots B and D. Nevertheless, these arcs will intersect at the point $B^1$, for obvious reasons.

*Bucket mounting and control*

As previously stated, the bucket 196 is mounted between the forward ends of the boom arms 188 and 190 by the trunnion means 192. It is desirable that the bucket be maintained level or substantially level between its digging position and its ultimate dumping position, so that material is not inadvertently dumped off until suitable tripping or actuating mechanism is operated. An improved control of this general nature is provided according to copending application, Serial No. 277,763, filed March 21, 1952.

The forward portions of the boom arms 188 and 190 are substantially rigidified by a transverse tubular member 266 just rearwardly of the bucket 196. A rockshaft 268 parallels and is located rearwardly of the transverse member 266, being journaled at its opposite ends respectively in bearing brackets 270 and 272 secured respectively to the boom arms 188 and 190.

The rockshaft 268 has rigidly secured thereto at one end thereof an upstanding control arm 274. The connection between the arm 274 and the rockshaft 268 may be effected by welding, as at 276 (Figure 2). A shorter arm 278 is rigidly secured, as by welding at 280, to the opposite end of the rockshaft 268 and extends upwardly parallel to the arm 274. The upper end of the arm 278 and an intermediate portion of the arm 274 are rigidly cross connected, as by a shaft 282, which is parallel to the rockshaft 268 and which lies above the rockshaft. Sleeved on the shaft 268 is a second rockshaft in the form of a tubular member 284 having rigidly secured respectively to its opposite ends first and second pairs of arms 286 and 288. Since the arms 286 and 288 are rigidly connected to the sleeve or tubular member 284, the two arms will move in unison.

The free or upper ends of the arms 286 are pivotally connected at 290 to the rear end of a forwardly extending control link 292, the forward end of which is pivotally connected at 294 to a portion of the bucket 196 above the trunnion pivot 192. The opposite arms 288 are pivotally connected at 296 to the rear end of a forwardly extending link 298 that has its forward end pivotally connected at 300 to a point on the bucket in transverse alinement with the point 294.

The control arm 274 will control swinging of the entire structure comprising the arms 286, 288 and transverse member 284. In the normal or level position of the bucket 196, as shown in full lines in Figure 1, the arm 274 will be inclined rearwardly. The free or upper end of the arm 274 is pivotally connected at 302 to a rearwardly extending stabilizing link 304, the rear end of which is pivotally connected at 306 to the upper end of the right-hand upright support 118. The connection at 306 is coincident with the point A, which, as previously stated, establishes the pivotal connection of the right-hand cylinder 218 to the upright support 118.

When the control arm 274 is in its full-line position as shown in Figure 1, the secondary control arm 286 has been moved rearwardly and downwardly so that the pivotal connection at 290 provides an over-center lock with relation to the centers at 284 and 294. As will be seen, the link 292 (as well as the symmetrical link 298) is arched to permit this result. Thus, the linkage 286—292 (or 288—298) establishes an over-center device which comprises in effect a prolongation of the stabilizing link 204. That is to say, as long as the over-center device is in the full-line position of Figure 1 the bucket may in effect be considered connected to the point A (or 306) by the linkage 304—286—292. The arrangement of the linkage just described is such that when the bucket is elevated to its intermediate position, it remains relatively level. However, since the point A is somewhat rearward of either of the points C or D, the bucket will be tipped slightly rearwardly about its trunnion axis 192—194 as the boom carries the bucket farther upwardly.

The over-center linkage 286—292 and 288—294 not only provides a prolongation of the stabilizing link 304 but serves also as means for effecting tilting of the bucket to its dumped position, as shown in Figure 3. For this purpose, the right-hand end of the transverse tubular 284 has rigidly secured thereto a depending sector 308 to the forward edge of which is connected a flexible actuating member in the form of a chain 310. This chain extends rearwardly and is loosely threaded through an eye member 312 carried on the inner face of the right-hand boom 188 just below the point B. The chain continues rearwardly and is connected to the forward end of a rod or link 314 which is in turn connected to an upright control lever 316. The lower end of the control lever 316 is pivoted at 318 to a lower portion of the inside plate 124 of the upright support 118. The lever 316 is moved rearwardly to tighten the chain 310 when it is desired to break the over-center lock and to cause the member 284 and its associated arms 286 and 288 to rock in a clockwise direction as seen in Figure 1, thus projecting the links 292 and 298 forwardly to tilt the bucket about its trunnion axis 192—194. When the boom structure is lowered to the ground, the bucket will be returned to its digging position and the over-center lock will again be established.

*Power system*

The detailed arrangement of the hydraulic power system forms the subject matter of copending application, Serial No. 292,171, filed June 6, 1952, and only a general outline thereof will be necessary here. Briefly, the hydraulic circuit, for present purposes, may be of any conventional type, including a pump and reservoir (not shown) and a main control valve 330 for controlling the motors 214. The numerals 364 and 366 indicate connecting hose lines between the motors 214 at opposite sides of the machine. The valve is regulated by a control lever 382.

*Summary*

The foregoing disclosure is, as previously stated, based upon a preferred embodiment of the invention for the purposes of efficiently achieving the desirable results as outlined above. The selectively effective double pivotal mounting of the boom structure on the frame provides a simple arrangement in which adequate power is available at all times during all phases of the digging and loading operations.

Various other important features of the invention not specifically enumerated will undoubtedly occur to those versed in the art, as likewise will numerous modifications and alterations in the preferred embodiment of the invention, all of which may be achieved without departing from the spirit and scope of the invention as defined in the appended claims.

What is claimed is:

1. A load-handling machine, comprising: base structure having front and rear ends and including generally upright support means; a load-bearing member extending forwardly from a rear end portion adjacent to the support means to a front end portion relatively remote from the support means; a lower pivot on the rear end portion of the member for connecting the member to the support means for swinging of the member through a first arcuate range between lower and upper positions; an upper pivot on the rear end portion of the member spaced above the lower pivot for connecting the member to the support means for swinging of the member through a second arcuate range between the upper position of the first range and a still higher position; first arcuate guide means on the support means formed about the lower pivot as a center with the distance between the pivots as its radius and extending rearwardly from the upper pivot to accommodate rearward movement of the upper pivot as the member swings about the lower pivot from the lower position to the upper position in its first arcuate range, said first guide means having at its rear end a seat against which the upper pivot abuts and is subsequently supported; second arcuate guide means on the support means having as its center the seat at the rear end of the first guide means and having as its radius the distance between the pivots, said second guide means having at its rear end a seat against which the lower pivot seats and is supported during swinging of the member in its first range, said second guide means extending generally forwardly and upwardly to accommodate movement of the lower pivot when the member swings through its second range about the rearwardly seated and supported upper pivot.

2. The invention defined in claim 1, further characterized by: force-exerting means connected between a point on the member spaced from the pivots and a point on the base structure spaced from the pivots to provide successively a first force triangle having said two points and one pivot as its apices and a second force triangle having said two points and the other pivot as its apices.

3. The invention defined in claim 2, further characterized in that: the point on the base structure is located closer to the upper pivot than to the lower pivot.

4. The invention defined in claim 1, further characterized in that: each of the guide means is in the form of an arcuate slot; and each pivot comprises a roller received and guided by the respective slot.

5. The invention defined in claim 1, further characterized by: force-transmitting means including a power element movable through a stroke of uniform power application; and means connecting the force-transmitting means between the member and the base structure to utilize the pivots as successive fulcra in the successive arcuate ranges of the member to thereby vary the power applied to the member from one range to the other in a single stroke of the power element.

6. The invention defined in claim 5, further characterized in that: the force-transmitting means is a fluid motor of the cylinder-piston type, and the power element is connected to the piston of the motor.

7. A load-handling machine, comprising: base structure having front and rear ends and including generally upright support means; a load-bearing member extending forwardly from a rear end portion adjacent to the support means to a front end portion relatively remote from the support means; first pivot means connecting the rear end portion of the member to a lower portion of the support means to fulcrum the member for vertical swinging between lower and upper positions in a first arcuate range; force-exerting means connected between a point on the support means above the first pivot means and a point on the member ahead of the first pivot means, said force-exerting means having force-applying elements arranged for relative movement through a range proportionately greater than the first arcuate range of the member; means for actuating the force-exerting means to move the elements thereof through only a portion of their range to cause the member to move from its lower position to its upper position in its first arcuate range; second pivot means intermediate the first pivot means and the point of connection of the force-exerting means to the support means and idle between the member and the support means during movement of the member from its lower position to its upper position and effective when the member reaches said position to provide a second fulcrum for vertical swinging of the member through a second arcuate range from said upper position to a still higher position; said first pivot means including releasably cooperative parts rendering said pivot idle during movement of the member in its second range; and said force-exerting means being effective through a further portion of the range of relative movement of said force-applying elements to move the member through said second range about said second fulcrum.

8. A load-handling machine, comprising: base structure having front and rear ends and including generally upright support means; a load-bearing member extending forwardly from a rear end portion adjacent to the support means to a front end portion relatively remote from the support means; selectively expansible and contractible power means connected at a first point on the support means above the rear end of the member and at a second point on the member intermediate the front and rear end portions of the member and operative to exert a force of contraction along a straight line between said two points; and means at the junction of the support means and the rear end portion of the member providing a pair of spaced apart pivots at different distances from said first point on the support means, one of said pivots releasably fulcruming the rear end portion of the member on the support means during a portion of the contraction of the power means, and the other of said pivots superseding said one pivot and releasably fulcruming the rear end portion of the member on the support means during a further portion of the contraction of said power means.

9. A load-handling machine, comprising: base structure having a fixed support member; a movable, load-bearing member; first and second fulcrum means fixed to one member on spaced apart parallel axes and engaging the other of the members for shifting in directions transverse to said axes; fulcrum control means for holding the first fulcrum means against shifting and permitting the second fulcrum means to shift for enabling pivoting of the movable member to swing in a first arcuate range about said first fulcrum means, said fulcrum control means being subsequently effective to interrupt shifting of the second fulcrum means and to permit shifting of the first fulcrum means to enable the movable member to swing in a succeeding second arcuate range about the other fulcrum means; and force-exerting means having connections respectively to the members at points spaced from both fulcrum means, the distance between one point on one member and one fulcrum means being different from the distance between said one point and the other fulcrum means so as to provide moment arms of different lengths, one effective in one range of the movable member and the other effective in the other range.

References Cited in the file of this patent

UNITED STATES PATENTS

| Number | Name | Date |
|---|---|---|
| 1,893,564 | Robb | Jan. 10, 1933 |
| 2,440,765 | Acton | May 4, 1948 |
| 2,474,998 | Acton | July 5, 1949 |
| 2,482,612 | Drott et al. | Sept. 20, 1949 |
| 2,488,699 | Anthony | Nov. 22, 1949 |
| 2,495,143 | Simmonds | Jan. 17, 1950 |
| 2,519,974 | Mork | Aug. 22, 1950 |
| 2,537,010 | Andersen | Jan. 9, 1951 |
| 2,621,817 | McNamara, Jr. | Dec. 16, 1952 |
| 2,624,481 | Richey | Jan. 6, 1953 |